Patented June 30, 1931

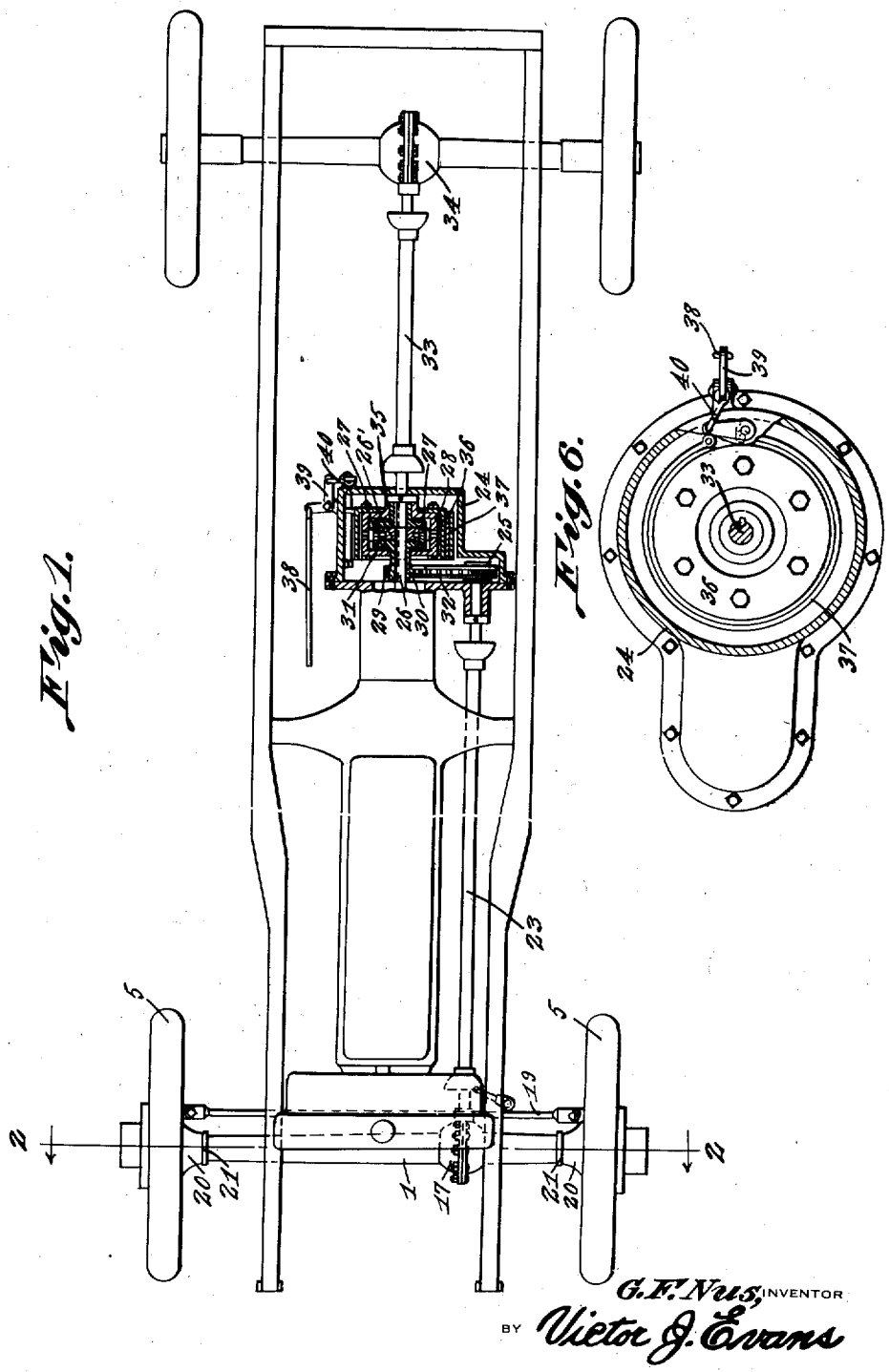

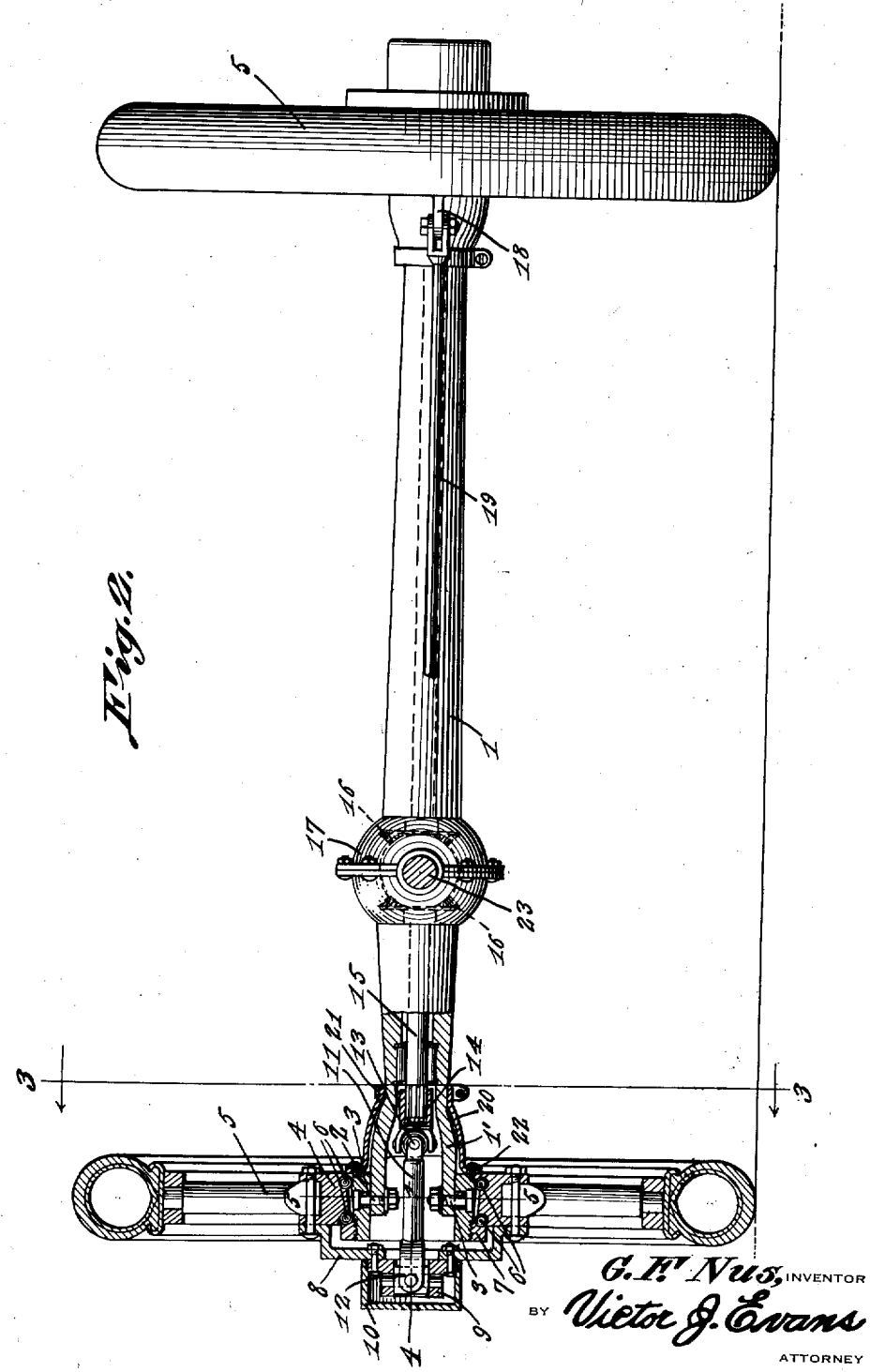

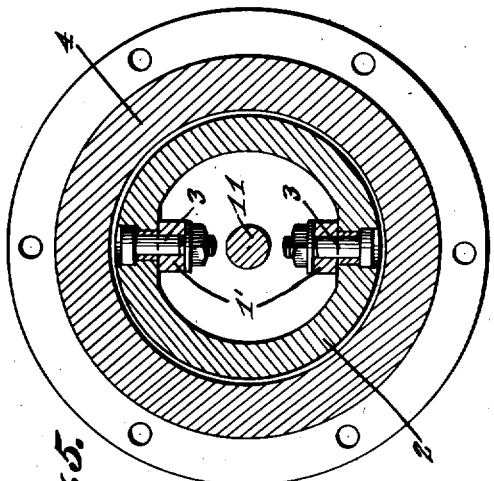
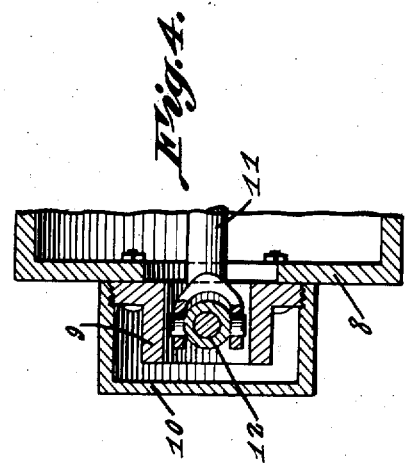
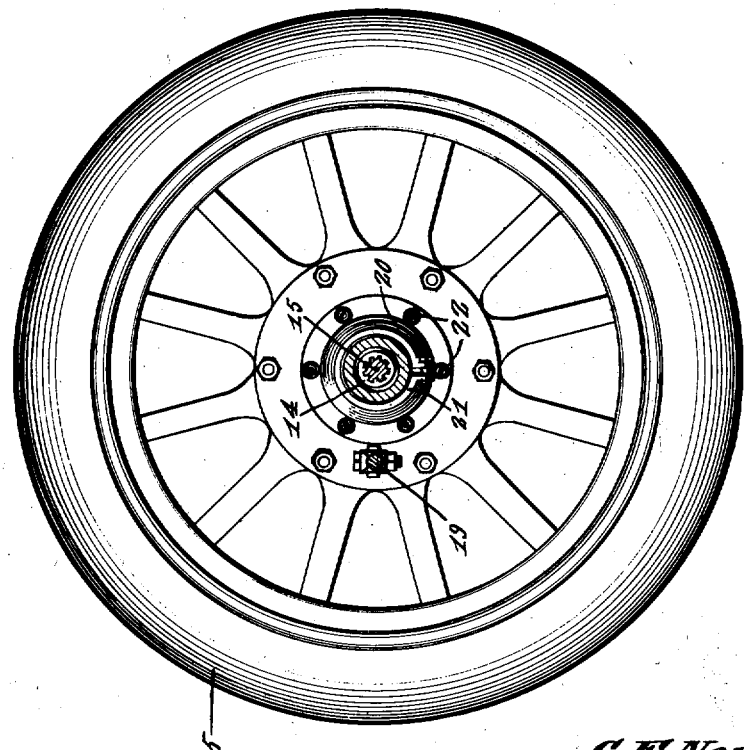

1,812,801

UNITED STATES PATENT OFFICE

GLEN F. NUS, OF ARLINGTON, IOWA

FRONT WHEEL DRIVE FOR AUTOMOBILES

Application filed March 25, 1929. Serial No. 349,749.

This invention relates to a four wheel drive for motor vehicles, the general object of the invention being to provide a spindle member which is pivotally connected to each end of the front axle so that it can move about a vertical axis, with means for rotatably supporting a front wheel on said spindle member, with flexible means for connecting the hub of the wheel with a drive shaft rotatably arranged in the axle.

Another object of the invention is to provide differential means for connecting the drive shafts of the two front wheels together and also to provide differential means for connecting the jack shafts of the front and rear wheels with each other and with the transmission shaft and to provide a brake on said differential.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a plan view of the chassis of a motor vehicle constructed in accordance with this invention, parts being shown in section.

Figure 2 is a section on line 2—2 of Figure 1.

Figure 3 is a section on line 3—3 of Figure 2.

Figure 4 is a section on line 4—4 of Figure 2.

Figure 5 is a section on line 5—5 of Figure 2.

Figure 6 is a sectional view through the transmission means which connects the jack shafts with the transmission shaft.

In these views, the numeral 1 indicates the front axle which is of tubular construction with its ends slightly enlarged, as shown at 1', and a ring-shaped spindle member 2 fits over the extremity of each enlarged part 1' and is pivotally connected therewith by the upper and lower aligned bolts 3 so that the spindle member can move about a vertical axis. The hub 4 of each front wheel 5 is rotatably supported on each spindle member by the anti-friction means 6 which are held in place by the nut 7 threaded to the outer end of the spindle member and suitably locked in position. A cover member 8 is fastened to the hub and encloses the outer end of the spindle member and said cover member has an opening therein over which is placed a member 9 which is bolted to the cover member and has an exterior threaded part to receive the hub cap 10. A short shaft 11 is connected to the member 9 at its outer end by the universal joint 12, and its inner end is connected by a universal joint 13 to a tubular part 14 which is splined to the outer end of a shaft 15 which is rotatably arranged in the axle 1. The two shafts 15 have their inner ends provided with gears 16 which form portions of a differential means, the housing of which is shown at 17, this housing forming portion of the front axle.

Each spindle member is formed with an opening 18 to which the connecting rod 19 of the steering mechanism is connected, so that the longitudinal movement of this rod 19 will turn the spindle members and, therefore, the wheels in unison so that the vehicle can be steered in the usual manner.

A flexible casing 20 has its inner end connected to a part of the axle 1 by the clamp 21 and its outer end is connected with the rear face of the spindle member, as shown at 22. A jack shaft 23 has its front end connected with a part of the differential means and its rear end extends into a housing 24 and has a sprocket 25 thereon. The transmission shaft 26 of the vehicle also extends into the housing and is fastened to a block 26' which carries the pinions 27, these pinions also being connected to a casing 28 so that the casing, the pinions and the block will rotate with the shaft 26. A hub 29 is loosely arranged on the shaft 26 and carries a sprocket 30 and a gear 31, the gear meshing with the pinions 27 and a chain 32 passes over the sprocket 30 and the sprocket 25. The shaft 33, which is connected with the differential 34 of the rear wheel, has a gear 35 on its front end which also meshes with the pinions 27, so that the means within the housing 24 forms a differential drive between the shaft 26 and the shafts 23 and 33.

A drum 36 is carried by the housing 28 and a brake band 37 engages the drum so that when the band is contracted by a suitable lever or pedal which is connected with the band by the link 38, the bell crank 39 and the links 40, the differential means in the housing 24 will be held against movement and thus all four wheels of the vehicle will be braked.

From the foregoing it will be seen that the front wheels as well as the rear wheels are driven from the power plant through the differential means shown, with flexible means for connecting the shafts 15 with the wheel so that the wheels can be turned in the steering movement of the vehicle without interfering with the driving thereof.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

In combination with a hollow axle having a shaft journaled therein, a tubular member housing the end of the shaft and splined upon said shaft, a stub shaft, a universal joint connection between said tubular member and said stub shaft and movable in alinement with the first mentioned shaft, a head member having universal joint connection with the other end of the stub shaft, a cover member attached to said head member, a wheel having its hub attached to said cover member, a bearing ring pivoted upon the end of the axle, the hub of the wheel receiving said ring and journaled thereon, said stub shaft normally lying upon the center of the ring with the universal joint connections thereof lying beyond the opposite sides of the wheel.

In testimony whereof I affix my signature.

GLEN F. NUS.